US012281399B1

(12) United States Patent
Li et al.

(10) Patent No.: US 12,281,399 B1
(45) Date of Patent: Apr. 22, 2025

(54) METHOD FOR DIRECTLY PREPARING TRIVALENT CHROMIUM COMPOUND BY ELECTROCHEMICAL OXIDATION OF FERROCHROME

(71) Applicant: QINGHAI INSTITUTE OF SALT LAKES, CHINESE ACADEMY OF SCIENCES, Xining (CN)

(72) Inventors: Bo Li, Xining (CN); Haitao Feng, Xining (CN); Yaping Dong, Xining (CN); Zhengrong Niu, Xining (CN); Wu Li, Xining (CN)

(73) Assignee: QINGHAI INSTITUTE OF SALT LAKES, CHINESE ACADEMY OF SCIENCES, Xining (CN)

( * ) Notice: Subject to any disclaimer, the term of this patent is extended or adjusted under 35 U.S.C. 154(b) by 0 days.

(21) Appl. No.: 18/723,895

(22) PCT Filed: Apr. 23, 2023

(86) PCT No.: PCT/CN2023/090140
§ 371 (c)(1),
(2) Date: Jun. 25, 2024

(87) PCT Pub. No.: WO2024/130917
PCT Pub. Date: Jun. 27, 2024

(30) Foreign Application Priority Data

Dec. 23, 2022 (CN) ........................ 202211671767.8

(51) Int. Cl.

| | |
|---|---|
| ***C25B 3/13*** | (2021.01) |
| ***C01G 37/02*** | (2006.01) |
| ***C01G 49/06*** | (2006.01) |
| ***C25B 1/00*** | (2021.01) |
| ***C25B 3/23*** | (2021.01) |
| ***C25B 11/046*** | (2021.01) |

(52) U.S. Cl.
CPC ................ *C25B 3/13* (2021.01); *C01G 37/02* (2013.01); *C01G 49/06* (2013.01); *C25B 1/00* (2013.01);
(Continued)

(58) Field of Classification Search
None
See application file for complete search history.

(56) References Cited

U.S. PATENT DOCUMENTS 1,492,636 A * 5/1924 Jouve .................... C01G 37/14 205/483
1,838,777 A * 12/1931 McCullough ........... C25D 3/06 205/286
(Continued)

FOREIGN PATENT DOCUMENTS

CN 103668301 A 3/2014
CN 106148706 A 11/2016
(Continued)

OTHER PUBLICATIONS

Partial English translation of Chao Li NPL document (Year: 2014).*
(Continued)

*Primary Examiner* — Harry D Wilkins, III
(74) *Attorney, Agent, or Firm* — Bayramoglu Law Offices LLC

(57) ABSTRACT

A method for directly preparing a trivalent chromium compound by electrochemical oxidation of ferrochrome is provided. The method includes: putting ferrochrome as an anode, and placing the anode into an electrolyte solution containing a complexing agent together with a cathode, then turning on a power supply for electrolysis reaction so that chromium and iron in ferrochrome are directly converted into free $Cr^{3+}$ and $Fe^{3+}$ respectively, allowing one of $Cr^{3+}$ and $fe^{3+}$ to form a stable soluble metal complex together
(Continued)

with the complexing agent, and allowing the other of $Cr^{3+}$ and $Fe^{3+}$ to form a metal hydroxide solid together with $OH^-$ generated by electrolysis reaction, so as to obtain an electrolysis completion slurry. Compared with the prior art, the present application has no hexavalent chromium salt stage, thereby shortening the process flow and avoiding the generation of chromium-containing waste residue.

14 Claims, 3 Drawing Sheets

(52) U.S. Cl.
CPC .............. *C25B 3/23* (2021.01); *C25B 11/046* (2021.01); *C01P 2002/72* (2013.01); *C01P 2004/03* (2013.01); *C01P 2006/80* (2013.01)

(56) References Cited

U.S. PATENT DOCUMENTS 1,878,918 A * 9/1932 Udy .................... C01G 37/033
205/487
2,988,492 A * 6/1961 Yoshida ................ C25D 3/562
205/256
4,393,029 A * 7/1983 Heimala ................ C01G 37/02
423/55
2011/0162974 A1* 7/2011 Kuwano ................ B82Y 30/00
423/607
2011/0168299 A1* 7/2011 Hoshino ................ B82Y 30/00
148/267
2012/0118749 A1* 5/2012 Pearson ................ C25D 21/18
205/101

FOREIGN PATENT DOCUMENTS

CN 106148988 A 11/2016
CN 107324303 A 11/2017
CN 115928108 A 4/2023
GB 1388204 A 3/1975

OTHER PUBLICATIONS

Chao Li, Research on Anode Electrochemical Dissolution of High-Carbon Ferrochrome Electrodeposition of Chromium in an Ion-Exchange Membrane Reactor, Dissertation for the Master Degree in Science, Harbin Institute of Technology, 2014, pp. 1-77.

* cited by examiner

METHOD FOR DIRECTLY PREPARING TRIVALENT CHROMIUM COMPOUND BY ELECTROCHEMICAL OXIDATION OF FERROCHROME

CROSS REFERENCE TO THE RELATED APPLICATIONS

This application is the national phase entry of International Application No. PCT/CN2023/090140, filed on Apr. 23, 2023, which is based upon and claims priority to Chinese Patent Application No. 202211671767.8, filed on Dec. 23, 2022, the entire contents of which are incorporated herein by reference.

TECHNICAL FIELD

The present application relates to a production method of a trivalent chromium salt, and particularly to a method for directly preparing a trivalent chromium compound by electrochemical oxidation of ferrochrome, belonging to the technical field of cleaning chemical industry.

BACKGROUND

At present, most of the production processes of chromium salts adopt a hexavalent chromium process route including a calcium-free roasting process with ferrochrome as a raw material, a sub-molten salt alkaline oxidation process, or high-temperature liquid phase oxidation with ferrochrome as a raw material, etc. These processes are all that a hexavalent chromium compound is prepared first and then a trivalent chromium salt or a trivalent chromium compound is produced based on the hexavalent chromium compound as a parent, which, on the one hand, can inevitably cause hexavalent chromium pollution, and on the other hand, has the defects of complicated process flow, high production cost and the like.

In order to thoroughly solve the problem of hexavalent chromium pollution, many researchers have been committed to developing a new process route for directly preparing trivalent chromium salts or trivalent chromium compounds from chromite or ferrochrome, and believe that the new process route may become an important way for the green development of chromium salt industry. For example, researchers have proposed a method for preparing trivalent chromium products based on acid leaching. By this method, high-carbon chromium iron alloy powders are used as a raw material, a chromium sulfate solution containing a low impurity content is obtained through sulfuric acid high-temperature agitation leaching by an oxalic acid iron removal method, subsequently a chromium hydroxide precipitate is obtained by adjusting the pH of the chromium sulfate solution and then a chromium dioxide product is obtained. However, this method requires that ferrochrome is crushed and ground into fine powders in advance, at the same time, a high-concentration acid with hydrogen ion concentration exceeding 10 mol/L is also used, and the reaction system is heated to a high temperature, or else, the passivation effect of ferrochrome in the acidic solution cannot be overcome. Nevertheless, the dissolution speed and efficiency of ferrochrome and the conversion rate of ferrochrome are still low. In addition, it is necessary to add other chemical reagents in this process to remove impurity iron, resulting in waste of chromium resources. Therefore, this method has high process cost and energy consumption during the implementation. The reaction process is difficult to control, which can easily cause acid mist and equipment corrosion. Therefore, this method is not suitable for promotion and application.

SUMMARY

The main objective of the present application is to provide a method for directly preparing a trivalent chromium compound by electrochemical oxidation of ferrochrome in order to overcome the defects in the prior art.

To achieve the above inventive objective, the technical solution adopted by the present application is as follows:

One aspect of the present application provides a method for directly preparing a trivalent chromium compound by electrochemical oxidation of ferrochrome, comprising: putting ferrochrome as an anode, and placing the anode into an electrolyte solution containing a complexing agent together with a cathode, then turning on a power supply for electrolysis reaction so that chromium and iron in ferrochrome are directly converted into free $Cr^{3+}$ and $Fe^{3+}$ respectively, allowing one of $Cr^{3+}$ and $Fe^{3+}$ to form a stable soluble metal complex together with the complexing agent, and allowing the other of $Cr^{3+}$ and $Fe^{3+}$ to form a metal hydroxide solid together with $OH^-$ generated by electrolysis reaction, so as to obtain an electrolysis completion slurry. And then, the electrolysis completion slurry is posttreated to prepare a trivalent chromium product and a trivalent iron product.

Another aspect of the present application provides a device for directly preparing a trivalent chromium compound by electrochemical oxidation of ferrochrome, comprising an anode, a cathode, an electrolysis tank and a power supply, wherein the anode is ferrochrome, the electrolysis tank is used for accommodating an electrolyte solution; an electrolysis completion slurry containing the soluble metal complex and the metal hydroxide solid is directly prepared after the anode, the cathode, the electrolyte solution and the power supply are combined to form an electrolysis reaction system and the electrolysis reaction is carried out.

Compared with the prior art, the present application at least has the following advantages:

(1) In the present application, industrial ferrochrome is used as an anode material, the preparation of the trivalent chromium salt is carried out by using an electrolysis method, and the trivalent chromium product is obtained in one step without the hexavalent chromium process, and chromium pollution is not generated, during the electrolysis.

(2) In the present application, the separation of chromium and iron elements and the electrolysis process are carried out at the same time without addition of other chemical reagents, thereby simplifying the process and improving the separation efficiency of iron and chromium. And the method of the present application is green and environmental-friendly.

(3) In the present application, the entire electrolysis reaction process can be carried out at room temperature and normal pressure, with mild reaction conditions, no high-temperature high-pressure equipment, low energy consumption and low equipment cost.

(4) In the present application, there are no special requirements for the shape and size of ferrochrome, with high reaction selectivity, rapid reaction speed and high chromium and iron conversion rate.

(5) In the present application, the reaction can be smoothly carried out in multiple low-concentration acidic electrolyte solutions without high-concentration acidic solutions, thereby completely eradicating acid mist and equipment corrosion.

(6) In the present application, the reaction process can achieve automated continuous control, especially the reaction can be started and ended timely according to actual situations, and is flexible to control.

BRIEF DESCRIPTION OF THE DRAWINGS

Specification drawings constituting a part of the present application are used for providing the further understanding of the present application, the illustrative embodiments of the present application and descriptions thereof are intended to explain the present application, but not improperly limit the present application.

DETAILED DESCRIPTION OF THE EMBODIMENTS

Figure 1:
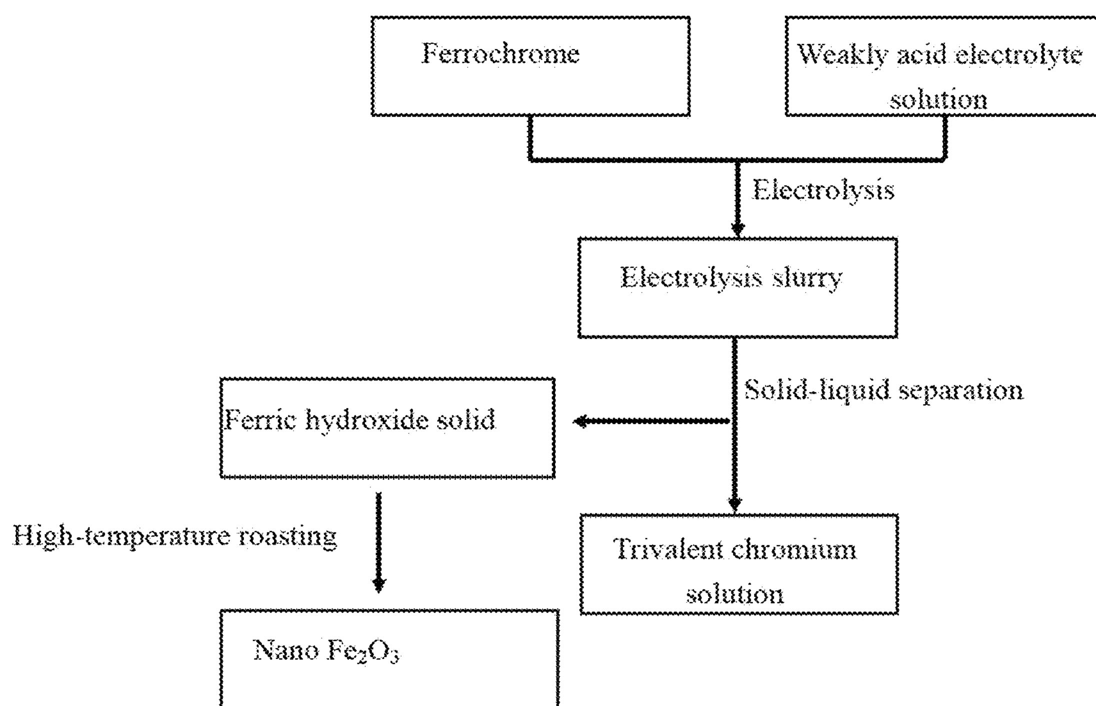
FIG. 1 is a process flowchart for directly preparing a trivalent chromium compound by electrochemical oxidation of ferrochrome in an embodiment of the present application.

In view of the defects of the prior art, the applicant proposes the technical solution of the present application by long-term researches and practice. Next, the technical solution will be described in detail.

Some embodiments of the present application provide a method for directly preparing a trivalent chromium compound by electrochemical oxidation of ferrochrome, comprising: putting ferrochrome as an anode, and placing the anode into an electrolyte solution containing a complexing agent together with a cathode, then turning on a power supply for electrolysis reaction so that chromium and iron in ferrochrome are directly converted into free $Cr^{3+}$ and $Fe^{3+}$ respectively, allowing one of $Cr^{3+}$ and $Fe^{3+}$ to form a stable soluble metal complex together with the complexing agent, and allowing the other of $Cr^{3+}$ and $Fe^{3+}$ to form a metal hydroxide solid together with $OH^-$ generated by electrolysis reaction, so as to obtain an electrolysis completion slurry.

In one embodiment, the complexing agent meets the following requirements, i.e., the complexing agent and $Cr^{3+}$ can form a stable soluble complex, and the complexing ability of the complexing agent with $Cr^{3+}$ is higher than that of the complexing agent with $Fe^{3+}$. Further, the complexing ability of the complexing agent with $Cr^{3+}$ is higher than that of $OH^-$ with $Cr^{3+}$, and the complexing ability of the complexing agent with $Fe^{3+}$ is lower than that of $OH^-$ with $Fe^{3+}$. Exemplarily, the complexing agent can include but is not limited to any one or any derivative of formic acid, acetic acid, ethane diacid, citric acid, oxalic acid, ethylenediamine tetraacetic acid, aminotriacetic acid, ethylenediamine, ammonia, triethyltetramine, cyanide and sulfosalicylic acid. That is, the complexing agent can be derived from organic acids such as formic acid, acetic acid, ethane diacid, citric acid, oxalic acid, ethylenediamine tetraacetic acid, aminotriacetic acid and sulfosalicylic acid, or organic amines such as ethylene diamine, ammonia and triethylenetetramine, or cyanides or derivatives thereof, for example soluble salts of these acids or ammonia alkali, but not limited thereto.

In another embodiment, the complexing agent meets the following requirements, i.e., the complexing agent together with $Fe^{3+}$ can form a stable soluble complex, and the complexing ability of the complexing agent with $Fe^{3+}$ is higher than that of the complexing agent and $Cr^{3+}$. Further, the complexing ability of the complexing agent with $Fe^{3+}$ is higher than that of $OH^-$ with $Fe^{3+}$, and the complexing ability of the complexing agent with $Cr^{3+}$ is lower than that of $OH^-$ with $Cr^{3+}$. Exemplarily, the complexing agent can include but is not limited to cyanide and sulfosalicylate ions, etc. That is, the complexing agent can be derived from sodium cyanide, potassium cyanide and sulfosalicylic acid or a soluble salt thereof, and is not limited thereto.

In one embodiment, the concentration of the complexing agent contained in the electrolyte solution is 0.1 mol/L-a saturation concentration.

In one embodiment, the electrolyte solution contained in the electrolyte solution is the complexing agent.

In one embodiment, the electrolyte solution further comprises other auxiliary electrolytes such as an acid, an alkaline and a salt, except the complexing agent.

In one embodiment, the ferrochrome can include but is not limited to industrial ferrochrome such as high-carbon ferrochrome, medium-carbon ferrochrome, low-carbon ferrochrome, micro-carbon ferrochrome and super-micro-carbon ferrochrome, or alloy materials such as silicon chromium alloy and stainless steel, preferably industrial ferrochrome, because it is cheap and easily availability.

In one embodiment, the ferrochrome can be in multiple shapes, such as a block, a sheet, a film and powder, and is not limited thereto.

In one embodiment, the power supply is a direct-current power supply. Further, an ammeter, a voltmeter, a current intensity adjustment mechanism (such as a variable resistor) and the like can be correspondingly set according to actual demands and methods well-known in the art.

In one embodiment, the material of the cathode includes but is not limited to stainless steel or nickel, etc.

In one embodiment, the pH value of the electrolyte solution is 1-6.

In one embodiment, the electrolyte solution is a mixed solution comprising an acid and a soluble salt; or, the electrolyte solution is obtained by mixing the acid with an alkaline reagent.

Exemplarily, the acid includes but is not limited to one or more of formic acid, acetic acid, ethane diacid, citric acid, oxalic acid, ethylenediamine tetraacetic acid, aminotriacetic acid, hydrocyanic acid, sulfosalicylic acid, etc.

Exemplarily, the soluble salt includes but is not limited to salts of the acid, for example a sodium salt, a potassium salt and an ammonium salt.

Exemplarily, the alkaline reagent includes but is not limited to a combination of one or more of sodium hydroxide, potassium hydroxide, sodium carbonate, potassium carbonate, ammonia, ethylenediamine, triethylenetetramine, etc.

In one embodiment, the concentration of the electrolyte contained in the electrolyte solution is 0.1 mol/L-a saturation concentration. Exemplarily, the total concentration of the acid and the soluble salt contained in the electrolyte solution is 0.1 mol/L-a saturation concentration.

In one embodiment, the pH value of the electrolysis completion slurry is 7-10.

In one embodiment, when the electrolysis reaction is carried out, the current density of the anode is preferably 300-2100 $A/m^2$.

In one embodiment, the electrolysis reaction is carried out at a temperature of less than 100° C. and a pressure of no more than 1 atm, preferably at room temperature and normal pressure.

In one embodiment, the method further comprises a step of posttreating the electrolysis completion slurry. For example, solid-liquid separation is carried out on the electrolysis completion slurry by using a conventional method such as centrifugation, natural settling and filtration to obtain a soluble metal complex solution and a metal hydroxide solid.

Further, the metal hydroxide solid obtained by the solid-liquid separation is roasted to obtain a nano metal oxide.

Exemplarily, $Cr^{3+}$ and Fe generated in the electrolysis reaction can be respectively combined with the complexing agent and $OH^-$ generated in the electrolysis reaction to form a soluble trivalent chromium complex solution and a $Fe(OH)_3$ solid, then the soluble trivalent chromium complex solution is treated by using evaporative crystallization and other methods to prepare a trivalent chromium product, and the $Fe(OH)_3$ solid is treated through high-temperature roasting and other methods to obtain a product such as nano $Fe_2O_3$.

Conversely, $Cr^{3+}$ and Fe generated in the electrolysis reaction can also be respectively combined with $OH^-$ generated in the electrolysis reaction and the complexing agent to form a soluble trivalent iron complex solution and a $Cr(OH)_3$ solid, then the soluble trivalent iron complex solution is treated by using evaporative crystallization and other methods to prepare a trivalent iron product, and the Cr(OH); solid is treated through high-temperature roasting and other methods to obtain a product such as nano $Cr_2O_3$.

In one more specific embodiment of the present application, referring to FIG. 1, the method specifically comprises:

- providing an electrolysis device comprising an electrolysis tank, a power supply, ferrochrome as an anode, and a cathode;
- placing the industrial ferrochrome and the cathode into the electrolysis tank accommodating the electrolyte solution, and partially or completely immersing the industrial ferrochrome and the cathode into the electrolyte solution which is weakly acidic and therefore is defined as a weak acid electrolyte solution; and
- electrically connecting the industrial ferrochrome and the cathode with the positive electrode and the negative electrode of the power supply respectively, so as to start the electrolysis reaction and then respectively convert chromium and iron in ferrochrome into free $Cr^{3+}$ and $Fe^{3+}$.

Where, the reaction equation of the electrolysis reaction is as follows:

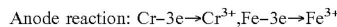

Anode reaction: $Cr-3e \rightarrow Cr^{3+}, Fe-3e \rightarrow Fe^{3+}$

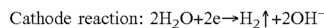

Cathode reaction: $2H_2O+2e \rightarrow H_2\uparrow+2OH^-$

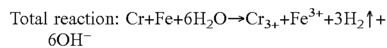

Total reaction: $Cr+Fe+6H_2O \rightarrow Cr_{3+}+Fe^{3+}+3H_2\uparrow+6OH^-$

As the electrolysis proceeds, the cathode will continuously generate OH, $OH^-$ in the electrolyte solution gradually and selectively forms a ferric hydroxide precipitate together with the trivalent iron salt so as to form a solid phase, and trivalent chromium is still present in a form of a stable soluble trivalent chromium complex, so as to obtain a solid-liquid mixed electrolyte solution slurry; the reaction equation is as follows:

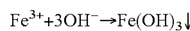

$Fe^{3+}+3OH^- \rightarrow Fe(OH)_3\downarrow$

Finally, a soluble trivalent chromium complex and a $Fe(OH)_3$ solid can be respectively obtained by solid-liquid separation. The $Fe(OH)_3$ solid can be converted into $Fe_2O_3$ through high-temperature roasting.

In the process of electrolysis reaction, the electrolysis reaction is initiated or stopped by turning on or turning off the power supply according to actual demands, or the speed of the electrolysis reaction is increased or reduced by increasing or decreasing the current intensity.

Some embodiments of the present application also provide a device for preparing a trivalent chromium salt by electrochemical oxidation of ferrochrome, comprising an anode, a cathode, an electrolysis tank and a power supply, wherein the anode is ferrochrome, and the electrolysis tank is used for accommodating the electrolyte solution; after the anode, the cathode, the electrolyte solution and the power supply are combined to form an electrolysis reaction system and the electrolysis reaction is carried out, an electrolysis completion slurry containing the soluble metal complex and the metal hydroxide solid is directly prepared.

Further, in the electrolysis reaction system, the anode and the cathode are both partially or completely immersed into the electrolysis solution, and the anode and the cathode are electrically connected with the positive electrode and the negative electrode of the power supply, respectively.

In one embodiment, the material of the cathode comprises stainless steel or nickel, etc., and is not limited thereto.

In addition, the device also comprises other auxiliary mechanisms that can be used or not used, for example a stirring mechanism, a temperature detection mechanism, a temperature adjusting mechanism, a pH value detection mechanism, etc., and not limited thereto. The use methods of these auxiliary mechanisms are all well-known in the art, and described in detail here.

By utilizing the method provided in the present application, a chromium element and an iron element in ferrochrome are respectively converted into $Cr^{3+}$ and $Fe^{3+}$ through direct-current electrolysis at room temperature and normal pressure in a certain pH value range, so as to form the trivalent chromium salt and the soluble trivalent iron salt, and subsequently $Cr^{3+}$ and $Fe^{3+}$ preferentially form the stable soluble metal complex together with the complexing agent in the electrolyte solution. As the electrolysis proceeds, $OH^-$ is generated by cathode hydrolysis so that the pH of the electrolyte system slowly raises, $OH^-$ gradually forms $Fe(OH)_3$ or $Cr(OH)_3$ together with $Fe^{3+}$ or $Cr_3$, so as to achieve the selective removal of $Fe^{3+}$ or $Cr^{3+}$. Certain concentrations of the soluble metal complex and the metal hydroxide solid can be obtained by solid-liquid separation. The metal hydroxide solid is subjected to further treatment such as high-temperature roasting, so as to obtain other side products. For example, ferric hydroxide is converted into $Fe_2O_3$ as an iron oxide red pigment product via further high-temperature roasting. Compared with the existing production method of the trivalent chromium product, on the one hand, the process flow is shortened without the hexavalent chromium salt stage, thereby avoiding the generation of chromium-containing waste residue; on the other hand, the effective separation of trivalent chromium ions and trivalent iron ions is synchronously achieved in the process of electrolysis by utilizing the selective stabilizing effect of the complexing agent in the electrolyte solution on $Cr^{3+}$ or $Fe^{3+}$ and the selective precipitation effect of $OH^-$ generated in electrolysis on $Cr^{3+}$ or $Fe^{3+}$ in the electrolyte solution without addition of other chemical reagents, thereby further simplifying the process flow; furthermore, no waste solutions and waste gases are basically generated, and therefore the method of the present application has good application prospects in the field of cleaning chemical industry.

Next, the technical solutions in embodiments of the present application will be clearly and completely described in combination with drawings in the embodiments of the present application. Obviously, the described embodiments are only some embodiments of the present application, but not all the embodiments. Unless otherwise specified, the various raw materials and equipment used in the following embodiments can be purchased from the market, and the various testing methods and equipment used are also common in this field Example 1

Figure 2:
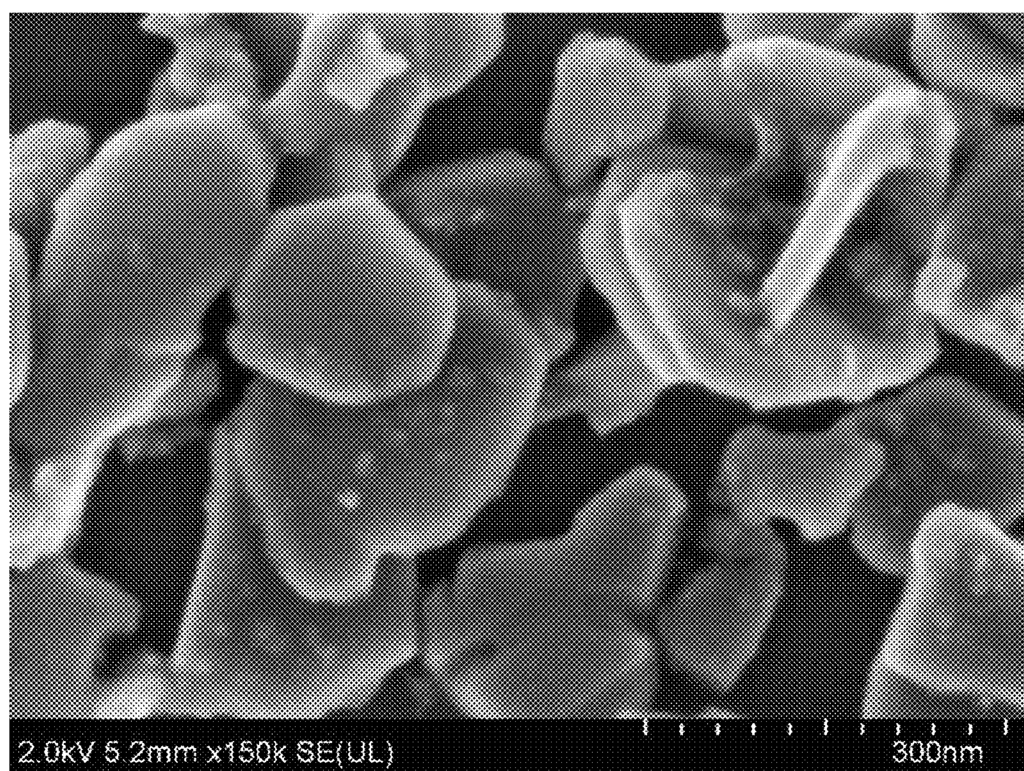
FIG. 2 is a scanning electron microscopy (SEM) image of nano $Fe_2O_3$ in example 1 of the present application.
Figure 3:
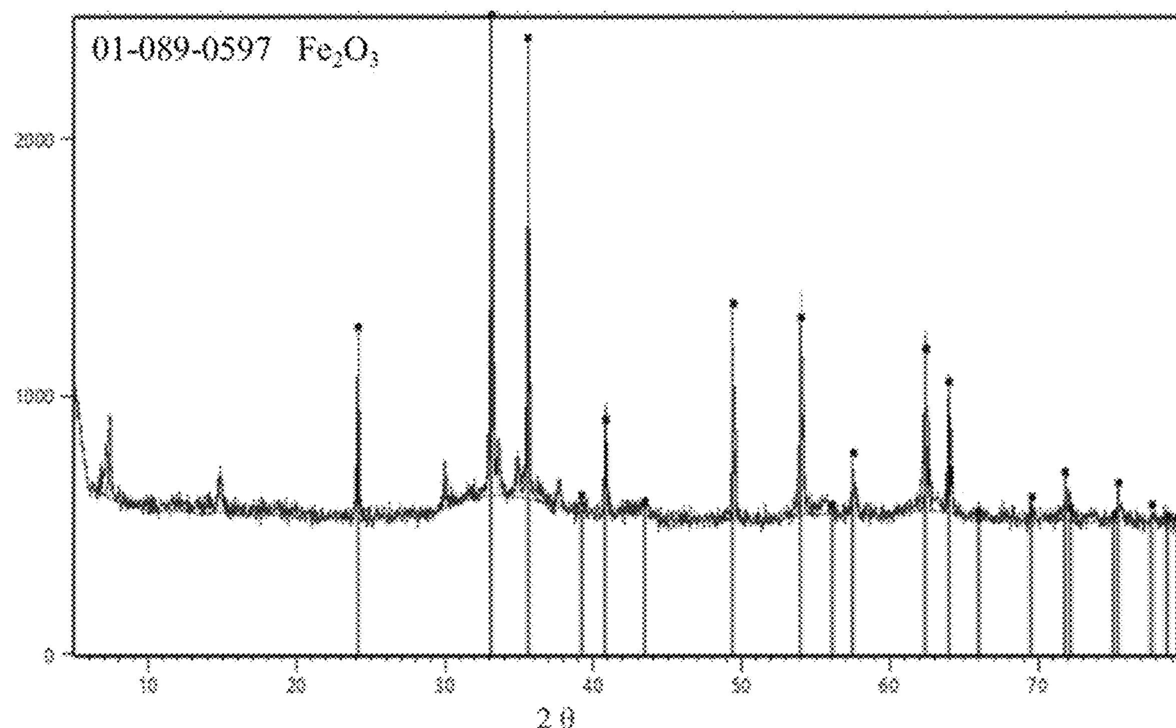
FIG. 3 is an X-ray diffraction (XRD) image of nano $Fe_2O_3$ in example 1 of the present application.

A certain amount of sodium hydroxide was added into an acetic acid solution having a concentration of about 2.0 mol/L to form an electrolyte solution having a pH value of about 1. Commercially available low-carbon ferrochrome irregular block material and a stainless steel sheet, respectively serving as an anode and a cathode, formed an electrolyte reaction system together with the electrolyte solution. A direct-current power supply was used to introduce about 25A of direct current (the current density of the anode was about 1500 $A/m^2$) into the electrolysis reaction system, the reaction was terminated after continuous electrolysis for about 72 h to obtain an electrolysis completion slurry with a pH value of about 7, and the electrolysis completion slurry was subjected to solid-liquid separation to obtain a trivalent chromium solution and a $Fe(OH)_3$ solid. The $Fe(OH)_3$ solid was roasted for about 2 h at about 1000° C. in air to obtain nano $Fe_2O_3$. The SEM and XRD characterization results are respectively shown in FIG. 2 and FIG. 3. In this example, the total current efficiency in the process of electrolysis was about 92.64%, the average tank voltage was about 3.54 V, the energy consumption for converting 1 ton of ferrochrome was about 5560 Kwh/t, the final total recovery rate of Cr was about 95.7%, and the recovery rate of Fe was about 96.3%. The content of Fe impurity in the obtained trivalent chromium solution was less than 80 ppm.

Example 2

Figure 4:
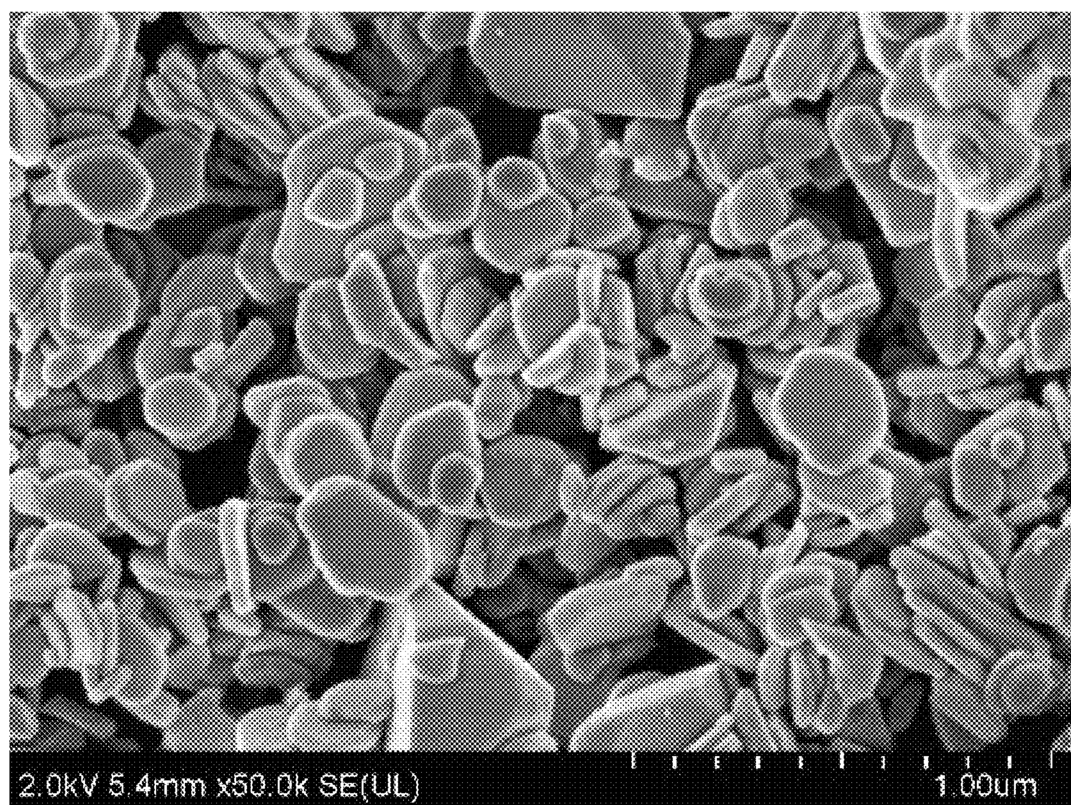
FIG. 4 is an SEM image of nano $Fe_2O$; in example 2 of the present application.
Figure 5:
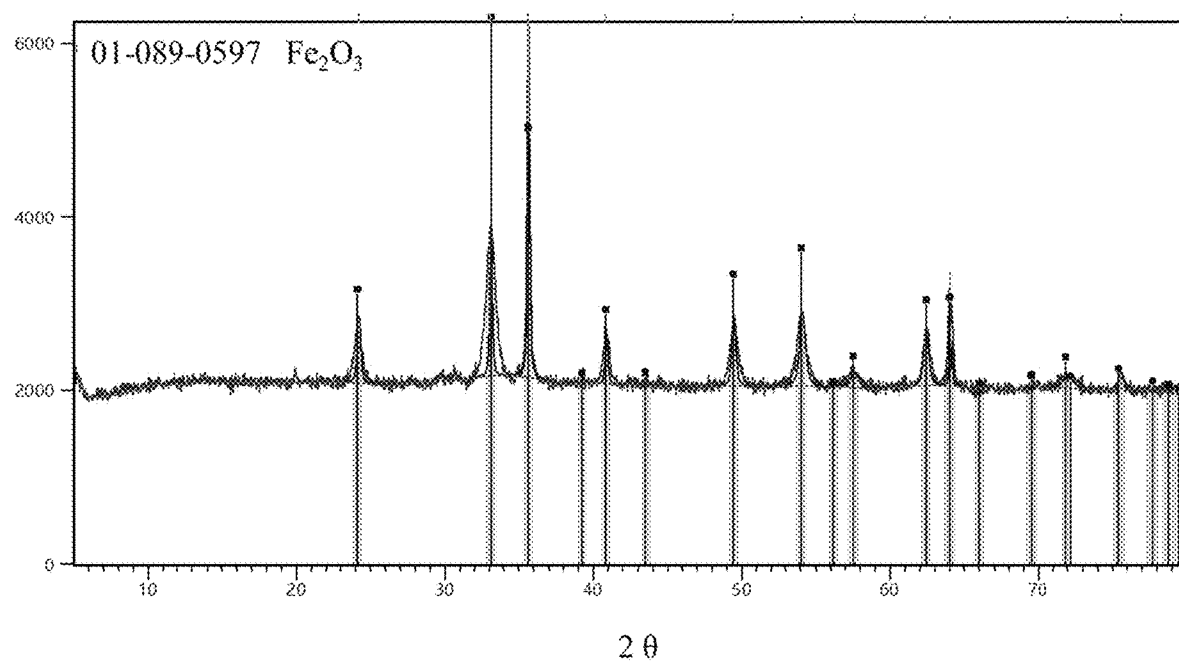
FIG. 5 is an XRD image of nano $Fe_2O_3$ in example 2 of the present application.

A certain amount of hydrochloric acid was added into an ethanediamine solution having a concentration of about 1.0 mol/L to form an electrolyte solution having a pH value of about 3. A commercially available low-carbon ferrochrome irregular block material and a stainless steel sheet, respectively serving as an anode and a cathode, formed an electrolyte reaction system together with the electrolyte solution. A direct-current power supply was used to introduce about 10 A of direct current (the current density of the anode was about 600 $A/m^2$) into the electrolysis reaction system, the reaction was terminated after continuous electrolysis for about 72 h to obtain an electrolysis completion slurry with a pH value of about 9, and the electrolysis completion slurry was subjected to solid-liquid separation to obtain a trivalent chromium solution and a $Fe(OH)_3$ solid. The $Fe(OH)_3$ solid was roasted for about 2 h at about 1000° C. in air to obtain nano $Fe_2O_3$. The SEM and XRD characterization results are respectively shown in FIG. 4 and FIG. 5. In this example, the total current efficiency in the process of electrolysis was about 93.96%, the average tank voltage was about 3.18 V, the energy consumption for converting 1 ton of ferrochrome was about 4916 kwh/t, the final total recovery rate of Cr was about 95.2%, and the recovery rate of Fe was about 91.1%. The content of Fe impurity in the obtained trivalent chromium solution was less than 80 ppm.

Example 3

A certain amount of potassium carbonate was added into an oxalic acid solution having a concentration of about 0.2 mol/L to form an electrolyte solution having a pH value of about 4. A commercially available medium-carbon ferrochrome irregular block material and a stainless steel sheet, respectively serving as an anode and a cathode, formed an electrolyte reaction system together with the electrolyte solution. A direct-current power supply was used to introduce about 25 A of direct current (the current density of the anode was about 1500 $A/m^2$) into the electrolysis reaction system, the reaction was terminated after continuous electrolysis for about 12 h to obtain an electrolysis completion slurry with a pH value of about 9.3, and the electrolysis completion slurry was subjected to solid-liquid separation to obtain a trivalent chromium solution and a $Fe(OH)_3$ solid. The $Fe(OH)_3$ solid was roasted for about 2 h at about 1000° C. in air to obtain nano $Fe_2O_3$. In this example, the total current efficiency in the process of electrolysis was about 90.14%, the average tank voltage was about 3.72 V, the energy consumption for converting 1 ton of ferrochrome was about 6160 kwh/t, the final total recovery rate of Cr was about 90.6%, and the recovery rate of Fe was about 92.1%. The content of Fe impurity in the obtained trivalent chromium solution was less than 80 ppm.

Example 4

A certain amount of sodium hydroxide was added into a citric acid solution having a concentration of about 0.5 mol/L to form an electrolyte solution having a pH value of about 6. A commercially available high-carbon ferrochrome irregular block material and a stainless steel sheet, respectively serving as an anode and a cathode, formed an electrolyte reaction system together with the electrolyte solution. A direct-current power supply was used to introduce about 35 A of direct current (the current density of the anode was about 2100 $A/m^2$) into the electrolysis reaction system, the reaction was terminated after continuous electrolysis for about 20 h to obtain an electrolysis completion slurry with a pH value of about 9.3, and the electrolysis completion slurry was subjected to solid-liquid separation to obtain a trivalent chromium solution and a $Fe(OH)_3$ solid. The $Fe(OH)_3$ solid was roasted for about 2 h at about 1000° C. in air to obtain nano $Fe_2O_3$. In this example, the total current efficiency in the process of electrolysis was about 89.58%, the average tank voltage was about 3.83 V, the energy consumption for converting 1 ton of ferrochrome was about 6293 kwh/t, the final total recovery rate of Cr was about 95.2%, and the recovery rate of Fe was about 90.6%. The content of Fe impurity in the obtained trivalent chromium solution was less than 80 ppm.

Example 5

A certain amount of ammonium hydroxide was added into an ethylenediamine tetraacetic acid (EDTA) having a concentration of about 0.1 mol/L to form an electrolyte solution having a pH value of about 6. A commercially available high-carbon ferrochrome irregular block material and a stainless steel sheet, respectively serving as an anode and a cathode, formed an electrolyte reaction system together with the electrolyte solution. A direct-current power supply was used to introduce about 5 A of direct current (the current density of the anode was about 300 A/$m^2$) into the electrolysis reaction system, the reaction was terminated after continuous electrolysis for about 20 h to obtain an electrolysis completion slurry with a pH value of about 9.0, and the electrolysis completion slurry was subjected to solid-liquid separation to obtain a trivalent chromium solution and a $Fe(OH)_3$ solid. The $Fe(OH)_3$ solid was roasted for about 2 h at about 1000° C. in air to obtain nano $Fe_2O_3$. In this example, the total current efficiency in the process of electrolysis was about 93.73%, the average tank voltage was about 3.46 V, the energy consumption for converting 1 ton of ferrochrome was about 5433 kwh/t, the final total recovery rate of Cr was about 95.2%, and the recovery rate of Fe was about 90.6%. The content of Fe impurity in the obtained trivalent chromium solution was less than 80 ppm.

Example 6

A certain amount of sodium hydroxide was added into a sulfosalicylic acid solution having a concentration of about 0.1 mol/L to form an electrolyte solution having a pH value of about 6. A commercially available high-carbon ferrochrome irregular block material and a stainless steel sheet, respectively serving as an anode and a cathode, formed an electrolyte reaction system together with the electrolyte solution. A direct-current power supply was used to introduce about 5 A of direct current (the current density of the anode was about 300 A/$m^2$) into the electrolysis reaction system, the reaction was terminated after continuous electrolysis for about 20 h to obtain an electrolysis completion slurry with a pH value of about 9.0, and the electrolysis completion slurry was subjected to solid-liquid separation to obtain a trivalent iron solution and a Cr(OH); solid. The $Cr(OH)_3$ solid was roasted for about 2 h at about 1000° C. in air to obtain nano $Cr_2O_3$. In this example, the total current efficiency in the process of electrolysis was about 90.33%, the average tank voltage was about 3.49 V, the energy consumption for converting 1 ton of ferrochrome was about 5687 kwh/t, the final total recovery rate of Cr was about 91.1%, and the recovery rate of Fe was about 93.5%. The content of Cr impurity in the obtained trivalent iron solution was less than 100 ppm.

Comparative Example 1

A commercially available low-carbon ferrochrome irregular block material was smashed into fine particles with a particle size of less than 75 μm and then added into a $H_2SO_4$ solution having a temperature of greater than 90° C. and a concentration of about 9 mol/L, and the above materials were continuously stirred at a speed of 300 r/min, an acidic leaching solution containing $Cr_2$ ($SO_4$); and $FeSO_4$ was obtained after reacting for 8 h at normal pressure, wherein the concentration of $Cr_2$ ($SO_4$); was about 203 g/L, and the concentration of $FeSO_4$ was about 64 g/L. After that, oxalic acid with a stoichiometric ratio being about 1.20 folds was added in the acidic leaching solution to remove $FeSO_4$ so as to obtain a $Cr_2$ ($SO_4$); solution having a relatively high purity. By calculation, it can be seen that in this comparative example, the conversion efficiency of Cr was about 87%, and the conversion efficiency of Fe was about 85%. This method can generate a large amount of pollutants such as sulfur dioxide in the process of reaction, and the amount of sulfuric acid needs to be excessive, which was 10% or above.

Although the present application has been described with reference to illustrative embodiments, those skilled in the art will understand that various other changes, omissions, and/or additions may be made without departing from the spirit and scope of the present application, and substantial equivalents may be used to replace the substances or components of the embodiments. In addition, many modifications can be made without departing from the scope of this application to adapt specific situations or materials to the teachings of this application. Therefore, this article does not intend to limit the present application to the specific embodiments disclosed for executing the present application, but rather intends to include all embodiments belonging to the scope of the attached claims in the present application.

What is claimed is:

1. A method for directly preparing a trivalent chromium compound by an electrochemical oxidation of ferrochrome, comprising: putting the ferrochrome as an anode, and placing the anode into an electrolyte solution comprising a complexing agent together with a cathode, then turning on a power supply for an electrolysis reaction to directly convert chromium and iron in the ferrochrome into free $Cr^{3+}$ and free $Fe^{3+}$ respectively, allowing one of the free $Cr^{3+}$ and the free $Fe^{3+}$ to form a stable soluble metal complex with the complexing agent, and allowing remaining one of the free $Cr^{3+}$ and the free $Fe^{3+}$ to form a metal hydroxide solid with $OH^-$ generated by the electrolysis reaction to obtain an electrolysis completion slurry.

2. The method according to claim 1, wherein a pH value of the electrolyte solution is 1-6; and/or, a concentration of an electrolyte comprised in the electrolyte solution is 0.1 mol/L to a saturation concentration.

3. The method according to claim 2, wherein the electrolyte solution is a mixed solution comprising an acid and a soluble salt; or, the electrolyte solution is obtained by mixing the acid with an alkaline reagent.

4. The method according to claim 3, wherein the acid comprises at least one of formic acid, acetic acid, ethane diacid, citric acid, oxalic acid, ethylenediaminetetraacetic acid, aminotriacetic acid, hydrocyanic acid, and sulfosalicylic acid; and/or, the soluble salt comprises a sodium salt of the acid, a potassium salt of the acid, or an ammonium salt of the acid; and/or, the alkaline reagent comprises at least one of sodium hydroxide, potassium hydroxide, sodium carbonate, potassium carbonate, ammonia, ethylenediamine, and triethylenetetramine.

5. The method according to claim 1, wherein a concentration of the complexing agent comprised in the electrolyte solution is 0.1 mol/L to a saturation concentration; and/or, the complexing agent comprises one or a derivative of formic acid, acetic acid, ethane diacid, citric acid, oxalic acid, ethylenediaminetetraacetic acid, aminotriacetic acid, sulfosalicylic acid, cyanide, ethylenediamine, ammonia, and triethylenetetramine.

6. The method according to claim 5, wherein the electrolyte solution is a mixed solution comprising an acid and a soluble salt; or, the electrolyte solution is obtained by mixing the acid with an alkaline reagent.

7. The method according to claim 6, wherein the acid comprises at least one of the formic acid, the acetic acid, the ethane diacid, the citric acid, the oxalic acid, the ethylenediaminetetraacetic acid, the aminotriacetic acid, hydrocyanic acid, and the sulfosalicylic acid; and/or, the soluble salt comprises a sodium salt of the acid, a potassium salt of the acid, or an ammonium salt of the acid; and/or, the alkaline reagent comprises at least one of sodium hydroxide, potassium hydroxide, sodium carbonate, potassium carbonate, the ammonia, the ethylenediamine, and the triethylenetetramine.

8. The method according to claim 1, wherein the electrolyte solution is a mixed solution comprising an acid and a soluble salt; or, the electrolyte solution is obtained by mixing the acid with an alkaline reagent.

9. The method according to claim 8, wherein the acid comprises at least one of formic acid, acetic acid, ethane diacid, citric acid, oxalic acid, ethylenediaminetetraacetic acid, aminotriacetic acid, hydrocyanic acid, and sulfosalicylic acid; and/or, the soluble salt comprises a sodium salt of the acid, a potassium salt of the acid, or an ammonium salt of the acid; and/or, the alkaline reagent comprises at least one of sodium hydroxide, potassium hydroxide, sodium carbonate, potassium carbonate, ammonia, ethylenediamine, and triethylenetetramine.

10. The method according to claim 1, wherein a pH value of the electrolysis completion slurry is 7-10.

11. The method according to claim 1, wherein when the electrolysis reaction is carried out, a current density of the anode is 300-2100 $A/m^2$.

12. The method according to claim 1, wherein the electrolysis reaction is carried out at room temperature and normal pressure.

13. The method according to claim 1, further comprising: carrying out a solid-liquid separation on the electrolysis completion slurry to obtain a soluble metal complex solution and the metal hydroxide solid.

14. The method according to claim 13, further comprising: roasting the metal hydroxide solid obtained by the solid-liquid separation to obtain a nano metal oxide.

* * * * *